United States Patent Office 3,609,970
Patented Oct. 5, 1971

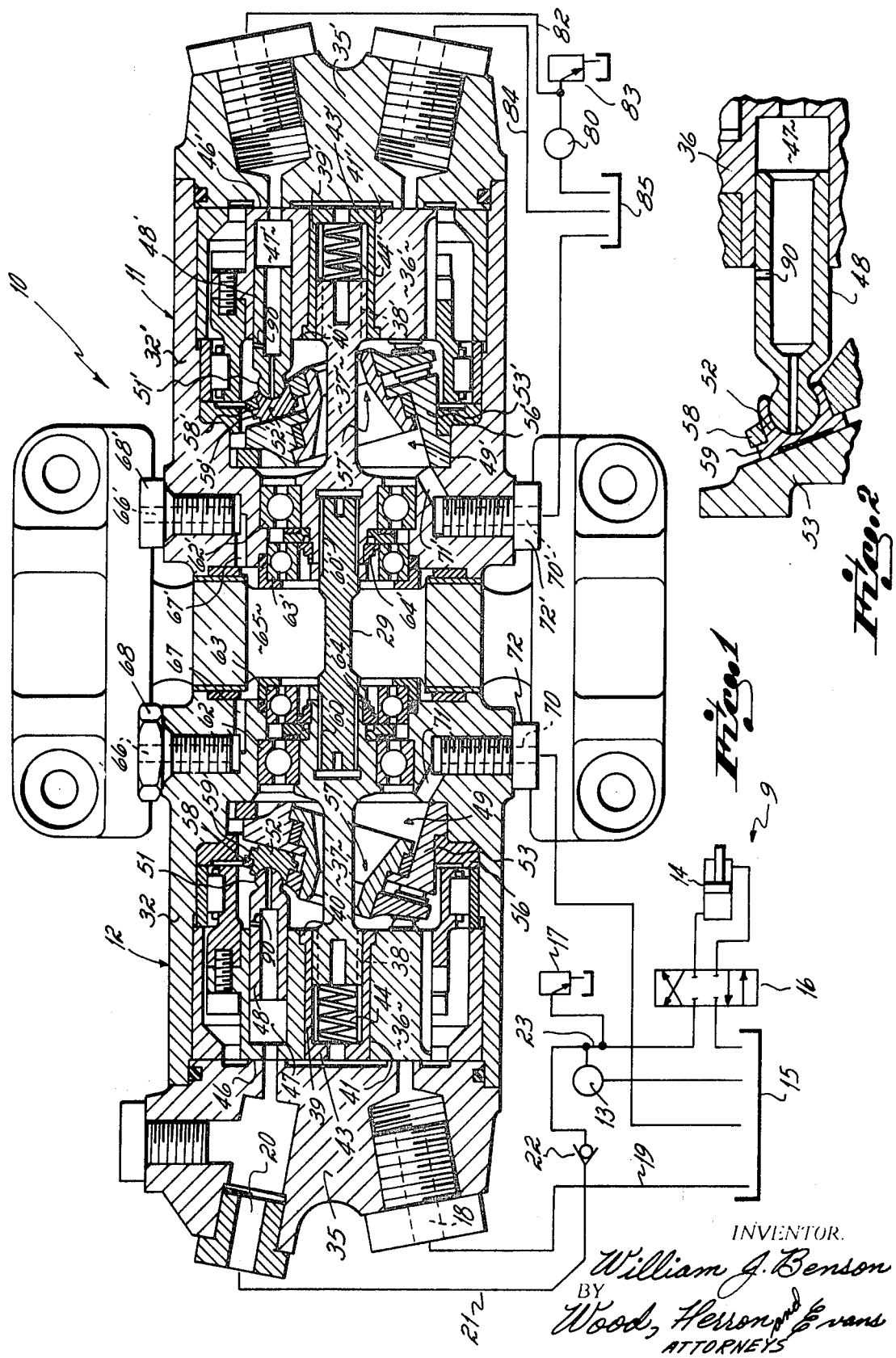

3,609,970
HYDRAULIC POWER TRANSFER METHOD
AND APPARATUS
William J. Benson, Camarillo, Calif., assignor to Abex
Corporation, New York, N.Y.
Filed Mar. 6, 1970, Ser. No. 17,254
Int. Cl. F15b *15/18*
U.S. Cl. 60—52 HC                    15 Claims

ABSTRACT OF THE DISCLOSURE

A method and apparatus for maintaining slow continuous rotation of an auxiliary power transfer unit when there is very little or no demand for fluid flow from the pump of the unit. This slow continuous rotation of the unit is accomplished by inducing internal pump leakage, which leakage is sufficient to maintain continuous rotation of the pump. Thereby intermittent starting and stopping or so-called "chugging" of the unit is avoided.

---

This invention relates to auxiliary fluid power supply systems and particularly to hydraulic power transfer units used in such systems.

Hydraulic power transfer units are now commonly used in aircraft to maintain an auxiliary hydraulic power supply in a "ready" or "primed" condition. Whenever the pressure in a control circuit, as for example a circuit operable to control a flap of an aircraft, falls below a preset value, the auxiliary power supply immediately takes over and maintains the pressure in the control circuit at the preset value. For example, if a control circuit normally operates at 3,000 p.s.i., the auxiliary power supply including the power transfer unit might be set to automatically supply fluid at 2,800 p.s.i. to the control circuit when the pressure in the control circuit falls to that value. This requires though that the auxiliary power circuit remain "primed" at 2,800 p.s.i. at all times.

A hydraulic power transfer unit comprises a hydraulic motor mechanically connected to a hydraulic pump. The pressure outlet of the pump is usually connected to the control circuit through a one-way check valve. Fluid under pressure is supplied to the motor which then maintains the pressure at the pressure port of the pump at the preset value.

One common problem with all power transfer units occurs in the low flow or no flow mode of operation in which the control circuit is receiving no fluid flow from the auxiliary power circuit. In this no flow mode of operation, the pressure at the pump outlet must be maintained at the preset "primed" value. However, internal leakage in the pump causes the pressure to slowly fall until the pressure differential between the pump and the motor overcomes the static friction of the unit and causes the pump and motor to rotate to again bring the pressure at the pump outlet up to the preset value. This condition is known as "chugging" of the power transfer unit. It occurs because the static start-up friction of the unit is greater than the dynamic running friction of the unit. At is worst, this chugging or intermittent operation of the transfer unit can be so violent as to vibrate a whole aircraft.

It has been the primary object of this invention to eliminate all "chugging" or intermittent on-off operation of an auxiliary power transfer unit. This objective has been obtained by inducing a predetermined amount of leakage from the pump to the case drain of the unit. This artificially induced leakage is sufficient to maintain the hydraulic motor and pump in continuous rotation at some predetermined low speed even though the outlet port of the pump is completely blocked. When the pump outlet port does open and there is a demand for fluid flow from the pump, the transfer unit then meets the demand by smoothly speeding up without the necessity for transition from static to dynamic motion.

To induce the predetermined leakage from the high pressure side of the hydraulic pump, in the preferred embodiment a hole is provided in each of the pump pistons which connects the cylinders of the pistons to the case drain. This hole is so positioned in the piston that it is only open during the pressure stroke portion of the unit.

The primary advantage of this invention is that it eliminates all of the objectionable vibration heretofore common in all auxiliary hydraulic power transfer units. Furthermore, it enables the transfer unit to supply hydraulic fluid under pressure to a control circuit very smoothly and with a minimum pressure differential between the control circuit and the auxiliary power supply circuit.

These and other objectives of the invention will be more readily apparent from the following description of the drawings in which:

FIG. 1 is a diagrammatic illustration of a hydraulic circuit incorporating the invention of this application, and including a cross-sectional view through a hydraulic pump-motor transfer unit.

FIG. 2 is an exploded cross-sectional view through a piston and piston shoe of the pump portion of the transfer unit of FIG. 1.

The hydraulic transfer unit 10 of this invention serves as an auxiliary power supply source for a hydraulic control circuit 9. Whenever the pressure in that control circuit 9 falls below a preset value, the auxiliary power supply circuit including the transfer unit 10 supplies fluid under pressure to the control circuit at the preset value. For example, the hydraulic circuit 9 might normally be maintained at a pressure setting of 3,000 p.s.i. and the auxiliary pressure supply unit or transfer unit might be set to supply pressure to the main control circuit 9 whenever the pressure in that circuit falls below 2,800 p.s.i. To that end, the transfer unit 10 must remain "primed" or in a ready condition with the outlet pressure from the pump portion 12 of the transfer unit 10 maintained at a preset pressure, as at a pressure of 2,800 p.s.i. in this example.

The maintenance of a preset pump outlet pressure of a predetermined or fixed value above atmospheric pressure has always been a problem because of the tendency of the pump to periodically rotate or "chug" while holding the pressure. This chugging occurs as a result of pump leakage internally of the pump, which leakage is unavoidable because of clerance spaces provided between the movable components or parts of the pump.

An illustrative hydraulic control circuit 9 of the type for which the transfer unit 10 could serve as an auxiliary power source comprises a pump 13 operable to supply fluid under pressure to one end of the cylinder of a hydraulic motor or ram 14. The opposite end of the cylinder is connected to tank 15. The direction in which the ram 14 moves is controlled by a conventional four-way valve 16, through which the direction of fluid flow may be reversed to the ram. The pressure maintained in the fluid supplied to the high pressure end side of the ram is controlled by a relief valve 17.

The hydraulic transfer unit 10 comprises an axial piston motor 11, the rotor of which is mechanically coupled to the rotor of an axial piston pump 12. The outlet port 20 of the pump 12 is connected by a fluid line 21 through a one-way check valve 22 to the pressure line 23 of the control circuit 9. The pump inlet port 18 is connected to tank 15 by a fluid line 19. So long as the pressure in the line 23 exceeds the pressure in the line 21, the one-way check valve 22 remains closed and there is no fluid flow from the outlet port 20 to the pump 12. Should the pressure in the line 23 of the main control circuit though drop below the pressure setting in the line 21, the check valve 22 opens and allows fluid to flow from the pump 12 to the control circuit 9, thereby supplementing and maintaining pressure in the control circuit 9.

The hydraulic motor 11 and the hydraulic pump 12 are identical axial piston hydraulic machines and both may be operated as either a pump or a motor. However, as connected in the fluid circuit illustrated in FIG. 1, the unit 11 is operable as a motor and the unit 12 as a pump.

The pump 12 and motor 11 are conventional, commercially available machines and therefore are not described in great detail herein. For purposes of simplifying the description of this application, only the axial piston pump 12 will be described. Similar components though, of the motor 11 have been given the same numerical designation, followed by a prime mark to distinguish them.

The machine 12, which functions as a pump, includes an outer casing 32 of multiple part construction suitably assembled as by tie bolts (not shown). The casing 32 includes a head 35 which is formed with an inlet port 18 and an outlet port 20, each of which is adapted to have a conventional coupling mounted therein.

A generally annular shaped cylinder block or barrel 36 is disposed within the outer casing 32 and is adapted to be rotated therein by a drive shaft 37. To that end, the shaft 37 is formed with external splines 38 at the end which are engageable with internal splines formed on a sleeve 39. The sleeve 39 is in turn axially disposed within a longitudinally extending central bore 41 formed in the annular cylinder barrel 36. The sleeve member 39 is connected to drive the cylinder barrel 36 through a splined connection (not shown). A web 43 in the sleeve 39 extends across the outer end thereof and a spring 44 is interposed between the web 43 and the end of the shaft 37. The sleeve 39 also includes a radially extending flange 40 which is seated within an annular recess formed within one face of the cylinder barrel 36 to prevent axial movement of the cylinder barrel 36 in one direction. The opposite face of the cylinder barrel 36 is engageable with and slidable on the inner face of the head 35 at the plane indicated by the reference numeral 46 so that the cylinder barrel is maintained in a fixed axial position within the outer casing.

The cylinder barrel 36 is formed with a plurality of axially extending cylinders or bores 47 disposed in an annular array. These bores 47 form chambers which are placed in alternate communication with the inlet port 18 and the outlet port 20 during rotation of the cylinder barrel 36.

Cylinder pistons 48 are slidable within the bores 47 and are adapted to be reciprocated back and forth therein as they are rotated relative to a swash plate mechanism indicated generally by the reference numeral 49. Each of the pistons 48 is rounded cylindrically, as indicated by the reference numeral 51, at the end which projects from the cylinder barrel 36. The rounded ends of the pistons 48 are received within complementary shaped recesses formed in slippers or shoes 52, thus affording a knuckle connection between the pistons 48 and the shoes 52. The shoes 52 are in turn slidable along the surface of a swash plate 53 in the course of the rotation of the cylinder barrel 36 and the pistons 48 carried therein. The swash plate 53 is suitably affixed within the housing 32 by a keeper ring 56. The shoes 52 are maintained in engagement with the swash plate 53 by a retainer assembly 57 which includes a ring 58 engageable with a radial flange 59 formed integrally on the shoes 52.

The motor 11 and the pump 12 are both fixed displacement units because of the swash plates 53, 53′ being fixedly mounted at a predetermined angle relative to the axis of the units.

At their inner ends, the drive shafts 37, 37′ of the two units are mechanically interconnected by a connecting shaft 29. This shaft 29 is splined at both ends and is receivable within a splined bore 60, 60′ of the drive shafts so that it mechanically connects and interlocks them in driving relationship.

At its inner end, the drive shaft 37, is supported for rotation in the housing 32 by ball bearing raceways 62, 63. A fluid seal 64 is mounted between the drive shaft and the innermost ball bearing 63 so as to prevent fluid leakage from the pump to the motor or vice versa. Consequently, the drive fluid of the two systems may be different and one could even be a gas while the other is a liquid.

To maintain the integrity of the pump fluid system from the motor fluid system, the chamber 65 between the two units may be connected to a fluid drain through a port 66 of the pump or a port 66′ of the motor. The ports are connected to the chamber 65 through a passageway 67, 67′. As illustrated in the drawing, there is a connector plug 68, 68′ mounted within the ports 66, 66′.

The interior of the pump 12 within the housing 32 is connected to a drain port 70 via a passageway 71 and a fluid connector 72. Similarly, the interior of the motor 11 is connected to a drain port 70; via a fluid passageway 71′ and a fluid connector 72′. Any fluid drainage through the clearance spaces within the pump or motor is thus drained out of the pump at atmospheric pressure.

The axial piston pump or motor heretofore described is conventional and its operation is well known in the prior art. The invention of this application is concerned with the use of the two units, the pump 12 and the motor 11 in combination and mechanically interconnected as a power transfer assembly. When thus used, the combination unit 10 serves as an auxiliary power source or supply for fluid under pressure to the control circuit 9 to supplement or replace the power unit or pump 13 in supplying fluid under pressure to the circuit.

As an example of the type of fluid circuit in which the power transfer unit 10 might be applicable as an auxiliary fluid power source, assume that the pump 13 supplies fluid under pressure to the ram 14 at a pressure of 3,000 p.s.i. Pump 12 might then be set to supply fluid under pressure in line 21 at a pressure slightly less than the pressure setting of the control circuit, as for example, 2,800 p.s.i. The check valve 22 would then remain closed so long as the pressure in line 23 exceeded the pressure in line 21.

A pump 80 is utilized to supply fluid under pressure to the motor 11 through a fluid line 82. A pressure relief valve 83 connected to the line 82 maintains the pressure port of the motor at a pressure of approximately 2,800 p.s.i. The low pressure port of the motor is connected by line 84 to a tank 85 from which fluid is resupplied to the pump 80. Under normal operating conditions, when the check valve 22 is closed there is no demand for fluid from the transfer unit 10 to the control circuit 9. The unique feature of this invention is in its ability to continue slow rotation of the motor 11 and pump 12 under these conditions thereby maintaining system pressure when there is no flow demand in line 21 through check valve 22. This slow rotation eliminates the transition from static to dynamic friction upon start-up of the pump and motor. This transition from static to dynamic friction results from system leakage, i.e., internal leakage in the pump and motor which is manifested by a condition of intermittent starting and stopping of the motor 11 and pump 12.

In order to maintain the slow speed rotation of the pump 12 and motor 11 when there is no demand for fluid from the pump 12, a controlled amount of internal leakage is introduced into the pump and the motor driving the pump to effectively maintain a slow rotative speed. In a preferred embodiment, this controlled internal leakage of the pump and motor is accomplished by the provision of a radial hole 90 (see FIG. 2) in each piston 48 of the pump 12 and each piston 48′ of the motor 11. When the piston is in its extended position, as illustrated in FIG. 2, this radial hole 90 connects the interior of the cylinder to the case drain 70. The hole 90 is so positioned axially in the piston that it is open during a large portion of the suction and discharge or pressure stroke of the piston. The positive bypass of low pressure flow to the pump case through the hole or port 90 in the piston combines with and assists in cooling the small amount of high pressure leakage through the pump. In this manner, the hydraulic transfer unit 10 operates consistently at some low speed even though there is no demand for fluid from the pump and the check valve 22 remains closed. When a demand does exist and the check valve 22 opens, the pump 12 then meets the demand and supplies fluid to the control circuit 9 without the necessity for transition from static to dynamic operation. As a result, the unit starts up and meets the demand of the control circuit 9 very smoothly.

The size of the hole or aperture 90 is chosen so that it introduces an additional leakage which supplements the normal high pressure leakage of the pump to provide sufficient flow to maintain smooth rotation of the pump. For example, if the minimum slow speed of the pump at 2,800 p.s.i. is 400 r.p.m. and if .75 gallon per minute is required to maintain that 400 r.p.m., the holes 90 are so sized as to permit leakage flow of the difference between the normal leakage of the pump at 2,800 p.s.i. and .75 gallon per minute. Bypassed leakage flow from the case drain then passes through the drain port 72 back to tank 15. Alternatively, the bypassed flow may be returned directly to the inlet side of the pump through appropriate porting in the pump case or housing 32.

Only a single embodiment of a slow speed porting arrangement has been illustrated herein. Others skilled in this art though will readily appreciate that internal leakage in the pump may be introduced by other techniques so as to maintain minimum speed continuous rotation of the pump and prevents "chugging" or intermittent operation when there is no demand from it. I have found though that the leakage porting 90 is preferably so positioned that most of the leakage occurs on the pressure stroke of the piston. In this way the slow speed rotation of the pump may be better controlled than if the leakage is introduced at some other point in the pump cycle of operation.

While only a single preferred embodiment of t' is invention has been illustrated and described herein, those persons skilled in the arts to which this invention pertains will readily appreciate numerous changes and modifications which may be made without departing from my invention. Therefore, I do not intend to be limited except by the appended claims.

Having described my invention, I claim:

1. The method of smoothly and with a minimum transient shift transferring hydraulic power from an auxiliary hydraulic circuit to another completely separate second hydraulic circuit, which auxiliary hydraulic circuit comprises a hydraulic motor mechanically connected to a hydraulic pump, which circuits are independently operable but are interconnected by a normally blocked hydraulic conduit connected to the pressure port of said pump, which method comprises operating the second hydraulic circuit at a pressure level above a minimum pressure level, maintaining the first auxiliary circuit in a ready condition at a second pressure level slightly below said minimum pressure level of said second circuit, and opening said normally blocked hydraulic conduit automatically to interconnect said circuits whenever the pressure in said second circuit falls below said minimum pressure level, the improvement which comprises continuously operating said motor and pump when said conduit is blocked by leaking fluid from said pump at a rate operable to maintain said pump and motor in continuous smooth operation.

2. The method of smoothly and with a minimum transient shift transferring hydraulic power from an auxiliary hydraulic circuit to another completely separate control hydraulic circuit, which auxiliary hydraulic circuit comprises a rotatable hydraulic motor having a rotor mechanically connected to the rotor of a rotatable hydraulic pump, which circuits are independently operable but are interconnected by a normally blocked hydraulic conduit connected to the pressure port of said pump, which method comprises operating the control hydraulic circuit at a pressure level above a minimum pressure level, maintaining the auxiliary circuit in a ready condition at a second pressure level slightly below said minimum pressure level of said control circuit, and opening said normally blocked hydraulic conduit automatically to interconnect said circuits whenever the pressure in said control circuit falls below said minimum pressure level, the improvement which comprises leaking fluid from said pump when said conduit is blocked at a rate operable to maintain said pump and motor in continuous rotation.

3. The method of claim 2 wherein said pump is an axial piston pump and leaking from said pump occurs primarily during the pressure stroke of said pistons.

4. The method of smoothly and with a minimum transient shift transferring hydraulic power from an auxiliary hydraulic circuit to another completely separate control hydraulic circuit, which auxiliary hydraulic circuit comprises a rotatable axial piston hydraulic motor having a rotor mechanically connected to the rotor of a rotatable axial piston hydraulic pump, which circuits are independently operable but are interconnected by a normally blocked hydraulic conduit connected to the pressure port of said pump, which method comprises operating the control hydraulic circuit at a pressure level above a minimum pressure level, maintaining the auxiliary circuit in a ready condition at a second pressure level slightly below said minimum pressure level of said control circuit, and opening said normally blocked hydraulic conduit automatically to interconnect said circuits whenever the pressure in said control circuit falls below said minimum pressure level, the improvement which comprises continuously rotating the rotors of said motor and pump when said conduit is blocked by leaking fluid from said pump at a rate operable to maintain said pump and motor in continuous rotation.

5. The method of claim 4 wherein said leaking from said pump occurs primarily through orifices in the pistons of said pump.

6. The method of claim 5 wherein said leaking from said pump occurs primarily through orifices in the pistons of said pump during the pressure stroke of said pistons.

7. Apparatus for smoothly transferring hydraulic power from an auxiliary hydraulic circuit to another completely separate and independent second hydraulic circuit, the second hydraulic circuit being operable at a pressure level above a minimum pressure level, which apparatus comprises a normally blocked hydraulic conduit interconnecting the two circuits, means including a hydraulic motor mechanically connected to a hydraulic pump for maintaining the auxiliary circuit in a ready condition at a second pressure level slightly below said minimum pressure level of said second circuit, means for opening said normally blocked hydraulic conduit automatically to interconnect said circuits whenever the pressure in said second circuit falls below said minimum pressure level, the improvement which comprises means for continuously operating said motor and pump when said conduit is blocked by leaking fluid from said pump at a rate operable to maintain said pump and motor in continuous operation.

8. Apparatus for smoothly and with a minimum of transient shift transferring hydraulic power from an auxiliary hydraulic circuit to another completely separate hydraulic control circuit whenever the hydraulic pressure in said control circuit reaches a minimum pressure level, which apparatus comprises
    a normally blocked hydraulic conduit interconnecting said circuits,
    means including a rotatable hydraulic motor and a rotatable hydraulic pump for maintaining the auxiliary circuit in a ready condition at said minimum pressure level of said control circuit, said hydraulic motor having a rotor mechanically connected to a rotor of said hydraulic pump,
    means for opening said normally blocked hydraulic conduit automatically to interconnect said circuits whenever the pressure level in said control circuit falls to said minimum pressure level, the improvement which comprises
    means for continuously leaking fluid from said pump when said conduit is blocked at a rate operable to maintain said pump and motor in continuous rotation.

9. The apparatus of claim 8 wherein said pump is an axial piston pump and wherein said leaking of fluid from said pump occurs through said pistons primarily during the pressure stroke of said pistons.

10. Apparatus for smoothly and with a minimum of transient shift transferring hydraulic power from an auxiliary hydraulic circuit to another completely separate hydraulic control circuit whenever the hydraulic pressure level in said control circuit reaches a minimum pressure level, which apparatus comprises
    a normally blocked hydraulic conduit interconnecting said circuits,
    means including a rotatable axial piston hydraulic motor and a rotatable axial piston hydraulic pump for maintaining the auxiliary circuit in a ready condition at said minimum pressure level of said control circuit, said hydraulic motor having a rotor mechanically connected to a rotor of said hydraulic pump,
    means for opening said normally blocked hydraulic conduit automatically to interconnect said circuits whenever the pressure level in said control circuit falls to said minimum pressure level, the improvement which comprises
    means for continuously rotating the rotors of said motor and said pump when said conduit is blocked by leaking fluid from said pump at a rate operable to maintain said pump and motor in continuous rotation.

11. The apparatus of claim 10 wherein leakage orifices are provided in each of the pistons of said pump, said leakage orifices being dimensioned so that leaking fluid from said pump occurs at a rate sufficient to maintain said pump and motor in rotation through leakage primarily through said orifices.

12. The apparatus of claim 11 wherein said leakage orifices are so positioned in said pistons that the leakage of fluid through said orifices occurs primarily during the pressure stroke of said pistons.

13. A hydraulic transfer unit for use in an auxiliary hydraulic circuit which auxiliary hydraulic circuit is operable to supply hydraulic fluid to another completely separate and independent hydraulic control circuit through a normally blocked conduit whenever the pressure in the control circuit falls below a minimum pressure level and effects opening of said conduit, said hydraulic transfer unit comprising,
    a rotatable hydraulic motor and a rotatable hydraulic pump, a rotor in said motor mechanically connected to a rotor in said pump and
    means in said pump for continuously leaking fluid from the pump at a rate operable to maintain said pump and motor in continuous rotation when said conduit is blocked.

14. The hydraulic transfer unit of claim 13 wherein said pump is an axial piston pump and wherein said means for continuously leaking fluid from said pump comprises restrictive orifices in the pistons of said pump.

15. The hydraulic transfer unit of claim 14 wherein said orifices are so positioned in said pistons that the leakage of fluid through said orifices occurs primarily during the pressure stroke of said pistons.

References Cited
UNITED STATES PATENTS

| | | | |
|---|---|---|---|
| 2,463,325 | 3/1949 | Slomer | 91—33 X |
| 2,611,319 | 9/1952 | Strehlow et al. | 417—288 |
| 2,802,453 | 8/1957 | Harp et al. | 91—33 X |
| 2,845,868 | 8/1958 | Norlin | 417—287 X |

EDGAR W. GEOGHEGAN, Primary Examiner

U.S. Cl. X.R.

60—53 A; 91—33, 471, 490; 417—286